United States Patent
Narita et al.

(10) Patent No.: US 11,554,419 B2
(45) Date of Patent: Jan. 17, 2023

(54) ADDITIVE MANUFACTURING METHOD AND ADDITIVE MANUFACTURING APPARATUS

(71) Applicant: MITSUBISHI HEAVY INDUSTRIES, LTD., Tokyo (JP)

(72) Inventors: Ryuichi Narita, Tokyo (JP); Shuji Tanigawa, Tokyo (JP); Yasuyuki Fujiya, Tokyo (JP); Claus Thomy, Bremen (DE); Dieter Tyralla, Bremen (DE); Thomas Seefeld, Bremen (DE)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 63 days.

(21) Appl. No.: 17/225,459

(22) Filed: Apr. 8, 2021

(65) Prior Publication Data

US 2021/0370403 A1  Dec. 2, 2021

(30) Foreign Application Priority Data

May 27, 2020 (JP) .............................. JP2020-091870

(51) Int. Cl.
*B22F 10/366* (2021.01)
*B22F 10/28* (2021.01)
*B22F 10/85* (2021.01)
*B33Y 30/00* (2015.01)
*B33Y 10/00* (2015.01)
*B33Y 50/02* (2015.01)

(52) U.S. Cl.
CPC ............ *B22F 10/366* (2021.01); *B22F 10/28* (2021.01); *B22F 10/85* (2021.01); *B33Y 10/00* (2014.12); *B33Y 30/00* (2014.12); *B33Y 50/02* (2014.12)

(58) Field of Classification Search
CPC ........ B22F 10/366; B22F 10/28; B22F 10/85; B22F 5/009; B22F 5/04; B22F 12/44; B22F 10/38; B22F 10/36; B22F 3/003; B33Y 10/00; B33Y 30/00; B33Y 50/02; B33Y 40/00; Y02P 10/25
See application file for complete search history.

(56) References Cited

U.S. PATENT DOCUMENTS

| | | | | |
|---|---|---|---|---|
| 5,032,879 A * | 7/1991 | Buchmann | ............ | H01S 5/0264 257/466 |
| 10,295,845 B2 * | 5/2019 | Kliner | ...................... | B22F 12/00 |
| 10,668,535 B2 * | 6/2020 | Brown | ...................... | B22F 10/20 |
| 10,673,197 B2 * | 6/2020 | Kliner | ...................... | H01S 3/121 |
| 10,792,865 B2 * | 10/2020 | Philippi | .................. | B33Y 10/00 |
| 2018/0088358 A1 * | 3/2018 | Kliner | ...................... | B22F 10/31 |
| 2018/0161873 A1 * | 6/2018 | Brown | ................... | G03F 7/0037 |
| 2018/0205195 A1 * | 7/2018 | Kliner | .................. | H01S 3/1109 |
| 2018/0361728 A1 * | 12/2018 | Philippi | ................. | B33Y 10/00 |
| 2019/0299527 A1 * | 10/2019 | Kitamura | .............. | B29C 64/371 |
| 2020/0398340 A1 * | 12/2020 | Kusaka | .................... | B22F 10/20 |

FOREIGN PATENT DOCUMENTS

| | | |
|---|---|---|
| JP | 5235332 | 7/2013 |
| JP | 2017-020422 | 1/2017 |
| JP | 2019-178407 | 10/2019 |

* cited by examiner

*Primary Examiner* — Lawrence Averick
(74) *Attorney, Agent, or Firm* — Wenderoth, Lind & Ponack, L.L.P.

(57) ABSTRACT

An additive manufacturing method includes: forming a powder bed by supplying a raw material powder; and irradiating the raw material powder that forms the powder bed with a light beam having an intensity distribution of a second or higher order mode or of a top hat shape.

12 Claims, 15 Drawing Sheets

|  |  | SCANNING RATE (mm/s) | | | | |
| --- | --- | --- | --- | --- | --- | --- |
|  |  | 100 | 200 | 300 | 400 | 500 |
| OUTPUT (W) | 200 | POOR | POOR | POOR | POOR | POOR |
|  | 170 | POOR | POOR | POOR | POOR | POOR |
|  | 140 | POOR | POOR | POOR | GOOD | GOOD |
|  | 110 | POOR | GOOD | GOOD | POOR | POOR |
|  | 80 | GOOD | POOR | POOR | POOR | POOR |

FIG. 5A

|  |  | SCANNING RATE (mm/s) | | | | |
|---|---|---|---|---|---|---|
|  |  | 100 | 200 | 300 | 400 | 500 |
| OUTPUT (W) | 200 | POOR | POOR | GOOD | GOOD | GOOD |
|  | 170 | POOR | GOOD | GOOD | GOOD | GOOD |
|  | 140 | GOOD | GOOD | GOOD | GOOD | GOOD |
|  | 110 | GOOD | GOOD | GOOD | POOR | POOR |
|  | 80 | GOOD | POOR | POOR | POOR | POOR |

FIG. 5B

|  | | SCANNING RATE (mm/s) | | | | |
|---|---|---|---|---|---|---|
|  | | 100 | 200 | 300 | 400 | 500 |
| OUTPUT (W) | 200 | POOR | POOR | POOR | GOOD | GOOD |
| | 170 | POOR | POOR | GOOD | GOOD | GOOD |
| | 140 | POOR | GOOD | GOOD | GOOD | POOR |
| | 110 | GOOD | GOOD | POOR | POOR | POOR |
| | 80 | POOR | POOR | POOR | POOR | POOR |

FIG. 5C

ADDITIVE MANUFACTURING METHOD AND ADDITIVE MANUFACTURING APPARATUS

CROSS-REFERENCE TO RELATED APPLICATIONS

This application claims the benefit of priority to Japanese Patent Application Number 2020-091870 filed on May 27, 2020. The entire contents of the above-identified application are hereby incorporated by reference.

TECHNICAL FIELD

The disclosure relates to an additive manufacturing method and an additive manufacturing apparatus.

RELATED ART

Among additive manufacturing methods for additive manufacturing a three-dimensional object, for example, in an additive manufacturing method using a powder bed method, a three-dimensional object (fabricated object) is formed by repeatedly laminating with melting and solidifying metal powder which is raw material powder laid in layers, by irradiating the metal powder with an energy beam such as a light beam or an electron beam (see JP 2017-20422 A).

SUMMARY

In a region irradiated with the energy beam, the metal powder is rapidly melted. For this reason, there is a concern that quality of the fabricated object may deteriorate, for example, such that a cavity may be generated inside the fabricated object, or generated spatters may be attached to a surface of the fabricated object to reduce surface roughness of the fabricated object.

In view of the circumstances described above, an object of at least one embodiment of the disclosure is to improve the quality of a fabricated object formed by an additive manufacturing method.

(1) An additive manufacturing method according to at least one embodiment of the disclosure includes the steps of, forming a powder bed by supplying a raw material powder, and irradiating the raw material powder that forms the powder bed with a light beam having intensity distribution of a high-order mode that is the second order and higher order mode or of a top hat shape.

(2) An additive manufacturing apparatus according to at least one embodiment of the disclosure includes, a forming unit including a base plate on which a powder bed is formed by supplied raw material powder, and an irradiation unit capable of irradiating the raw material powder that forms the powder bed with a light beam having intensity distribution of a high-order mode that is the second order and higher order mode or of a top hat shape.

According to at least one embodiment of the disclosure, it is possible to improve the quality of a fabricated object formed by an additive manufacturing method.

BRIEF DESCRIPTION OF DRAWINGS

The disclosure will be described with reference to the accompanying drawings, wherein like numbers reference like elements.

FIG. 5A is a table showing the relationship between the output of the light beam, the scanning rate of the light beam, and the filling rate of a fabricated object, and shows a case of additive manufacturing by the light beam having the intensity distribution of the $TEM_{00}$ mode as a comparative example.

FIG. 5B is a table showing the relationship between the output of the light beam, the scanning rate of the light beam, and the filling rate of the fabricated object, and shows a case of additive manufacturing by the light beam having the intensity distribution of the $TEM_{10}$ mode as an example of a high-order mode.

FIG. 5C is a table showing the relationship between the output of the light beam, the scanning rate of the light beam, and the filling rate of the fabricated object, and shows a case of additive manufacturing by the light beam having the intensity distribution of a top hat shape.

DESCRIPTION OF EMBODIMENTS

Hereinafter, some embodiments of the disclosure will be described with reference to the accompanying drawings. It is intended, however, that dimensions, materials, shapes, relative positions or the like of the components described in the embodiments or illustrated in drawings shall be interpreted as illustrative only and not intended to limit the scope of the disclosure.

For instance, an expression of relative or absolute arrangement such as "in a direction", "along a direction", "parallel", "orthogonal", "centered", "concentric" or "coaxial" shall not be construed as indicating only the arrangement in a strict literal sense, but also includes a state where the arrangement is relatively displaced by a tolerance, or by an angle or a distance within a range in which it is possible to achieve the same function.

For example, an expression of an equal state such as "same", "equal", "uniform" or the like shall not be construed as indicating only the state in which the feature is strictly equal, but also includes a state in which there is a tolerance or a difference within a range where it is possible to achieve the same function.

Further, for example, an expression of a shape such as a rectangular shape, a cylindrical shape or the like shall not be construed as only the geometrically strict shape, but also includes a shape with unevenness, chamfered corners or the like within the range in which the same effect can be achieved.

On the other hand, an expression such as "provided", "comprise", "contain", "include", or "have" are not intended to be exclusive of other components.

Three-Dimensional Additive Manufacturing Apparatus 1

Figure 1:
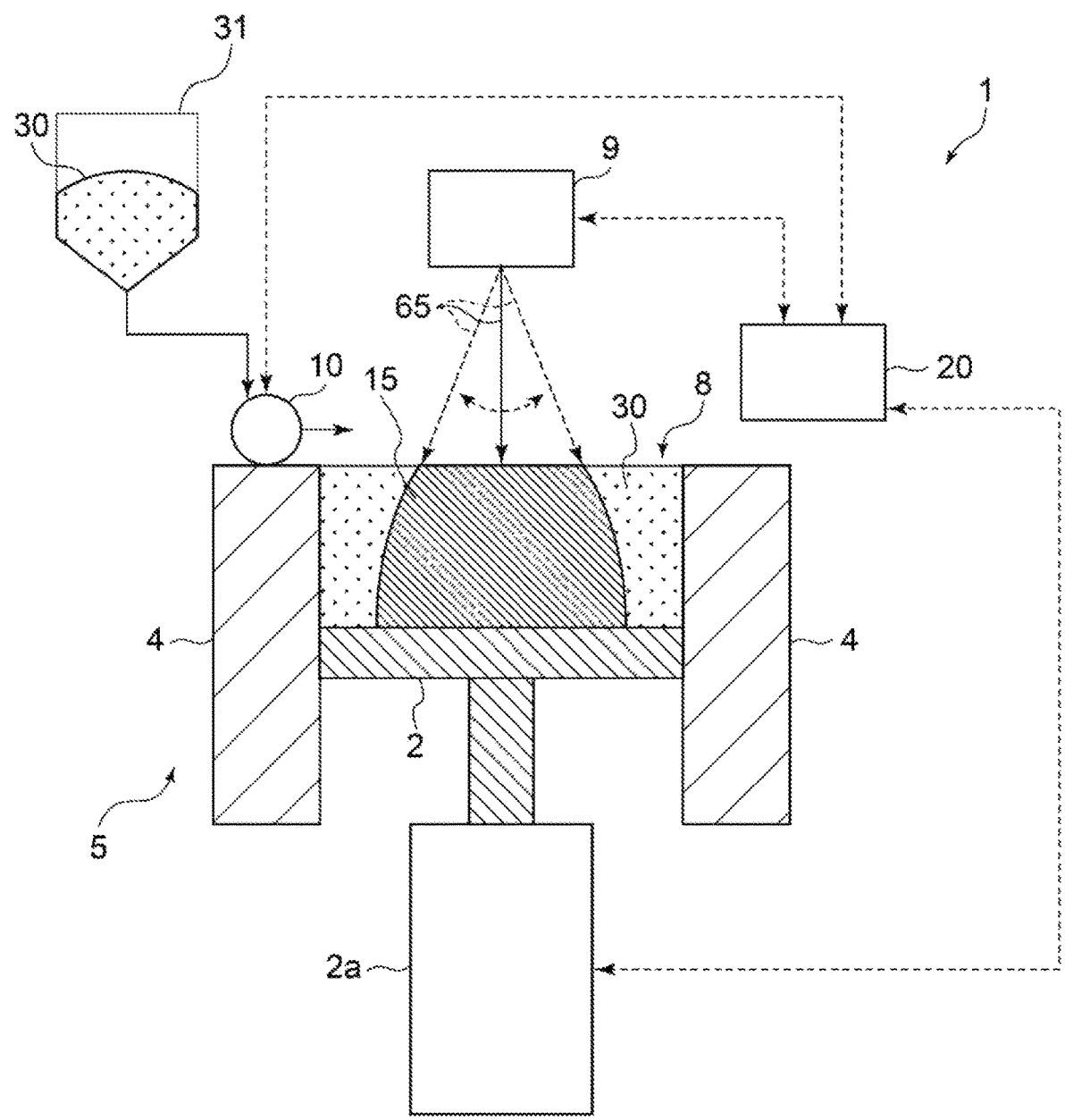
FIG. 1 is a schematic diagram illustrating an overall configuration of a three-dimensional additive manufacturing apparatus, as an apparatus to which an additive manufacturing method according to at least one embodiment of the disclosure is applicable.

FIG. 1 is a schematic diagram illustrating an overall configuration of a three-dimensional additive manufacturing apparatus 1, as an apparatus to which an additive manufacturing method according to at least one embodiment of the disclosure is applicable.

The three-dimensional additive manufacturing apparatus 1 is an apparatus for manufacturing a three-dimensional fabricated object 15 by performing additive manufacturing due to irradiation of a metal powder as a raw material powder laid in layers with a light beam 65 as an energy beam, and can perform additive manufacturing by a powder bed method.

The three-dimensional additive manufacturing apparatus 1 illustrated in FIG. 1 can form, for example, a rotor blade or a stator vane of a turbine such as a gas turbine or a steam turbine, or a component such as a combustor basket, a transition piece or a nozzle of a combustor.

The three-dimensional additive manufacturing apparatus 1 illustrated in FIG. 1 includes a storage unit 31 for raw material powder 30. The three-dimensional additive manufacturing apparatus 1 illustrated in FIG. 1 includes a powder bed forming unit 5 (an example of a forming unit) including a base plate 2 on which a powder bed 8 is formed of raw material powder 30 supplied from the storage unit 31. The three-dimensional additive manufacturing apparatus 1 illustrated in FIG. 1 includes a light beam irradiation unit 9 (an example of an irradiation unit) capable of irradiating the powder bed 8 with a light beam 65. The three-dimensional additive manufacturing apparatus 1 illustrated in FIG. 1 includes a control device 20, which is capable of controlling a powder laying unit 10 described later, a drive cylinder 2a of the base plate 2, and the light beam irradiation unit 9.

The base plate 2 serves as a base on which the fabricated object 15 is shaped. The base plate 2 is disposed, inside a substantially cylindrical cylinder 4 having a central axis extending in the vertical direction, so as to be vertically movable by a drive cylinder 2a. The powder bed 8 formed on the base plate 2 is newly formed by laying powder on the upper layer side every time the base plate 2 is lowered in each cycle during the manufacturing work.

The three-dimensional additive manufacturing apparatus 1 illustrated in FIG. 1 includes a powder laying unit 10 configured to lay raw material powder 30 on a base plate 2 to form a powder bed 8. The powder laying unit 10 supplies the raw material powder 30 from the storage unit 31 to the upper surface side of the base plate 2 and flattens the surface of the raw material powder 30, thereby forming the layered powder bed 8 having a substantially uniform thickness over the entire upper surface of the base plate 2. The powder bed 8 formed in each cycle is selectively solidified by being irradiated with the light beam 65 from the light beam irradiation unit 9, and in the next cycle, the raw material powder 30 is laid again on the upper layer side by the powder laying unit 10 to form a new powder bed 8, whereby the powder beds 8 are stacked in layers.

The raw material powder 30 supplied from the powder laying unit 10 is a powdery substance serving as a raw material of the fabricated object 15. For example, a metal material such as iron, copper, aluminum, or titanium, or a non-metal material such as ceramic can be widely used.

The control device 20 illustrated in FIG. 1 is a control unit of the three-dimensional additive manufacturing apparatus 1 illustrated in FIG. 1, and is composed of an electronic computation device such as a computer, for example.

In the control device 20 illustrated in FIG. 1, information on the shape of the fabricated object 15, that is, the dimensions of each part, which is necessary for manufacturing the fabricated object 15, is input. Information on dimensions or the like of each part necessary for manufacturing the fabricated object 15 may be input from, for example, an external device and stored in, for example, a storage unit (not illustrated) of the control device 20.

For example, in the additive manufacturing method using a powder bed method, raw material powder such as metal powder is rapidly melted in a region irradiated with an energy beam. For this reason, there is a concern that quality of the fabricated object may deteriorate, for example, such that cavities may be generated inside the fabricated object, or generated spatters may be attached to a surface of the shaped object to reduce surface roughness of the fabricated object.

In view of this, in the additive manufacturing methods according to some embodiments of the disclosure, the fabricated object 15 is manufactured as follows to solve the above-described problem. Hereinafter, additive manufacturing methods according to some embodiments of the disclosure will be described.

Flowchart

Figure 2A:
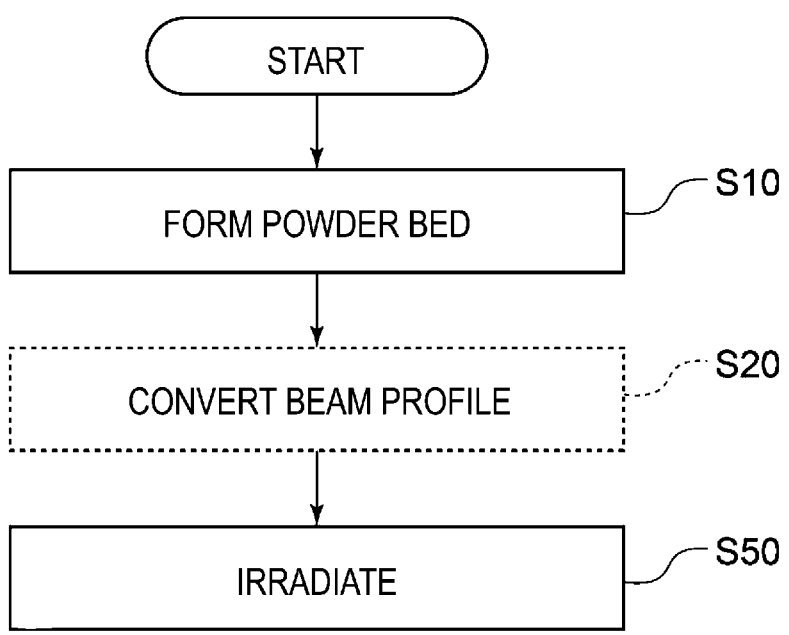
FIG. 2A is a flowchart illustrating a processing procedure in the additive manufacturing method according to at least one embodiment of the disclosure.

FIG. 2A is a flowchart illustrating a processing procedure in an additive manufacturing method according to one embodiment.

Figure 2B:
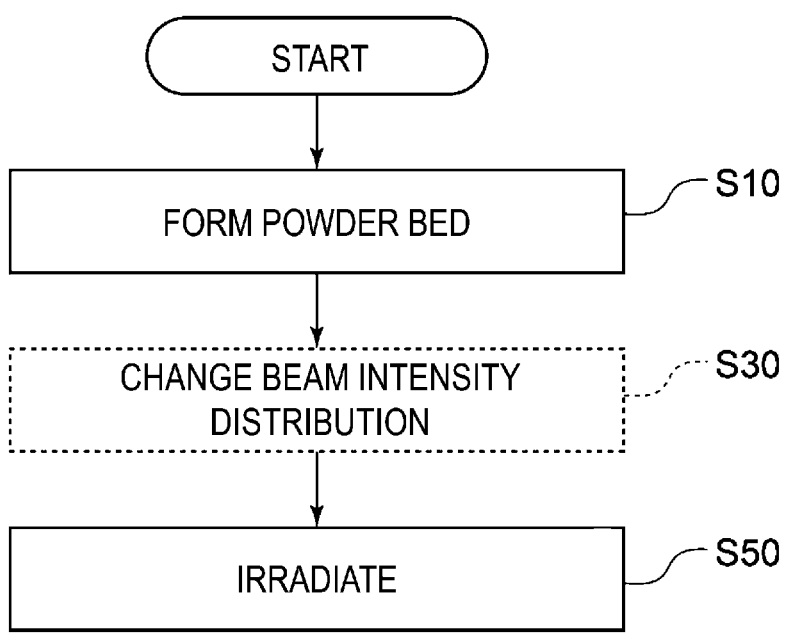
FIG. 2B is a flowchart illustrating a processing procedure in the additive manufacturing method according to another embodiment.

FIG. 2B is a flowchart illustrating a processing procedure in an additive manufacturing method according to another embodiment.

The additive manufacturing methods according to some embodiments illustrated in FIGS. 2A and 2B include a powder bed forming step S10 and an irradiation step S50. The additive manufacturing method illustrated in FIG. 2A may further include a beam profile conversion step S20.

The additive manufacturing method illustrated in FIG. 2B further includes a beam intensity distribution changing step S30.

In the additive manufacturing methods according to some embodiments illustrated in FIGS. 2A and 2B, the fabricated object 15 can be formed by repeatedly performing the powder bed forming step S10 and the irradiation step S50.

Powder Bed Forming Step S10

The powder bed forming step S10 is a step of forming the powder bed 8 by supplying the raw material powder 30. That is, the powder bed forming step S10 is a step of supplying the raw material powder 30 from the storage unit 31 to the powder bed 8 and laminating the raw material powder 30 to a prescribed thickness.

Specifically, the control device 20 according to some embodiments controls the drive cylinder 2a such that the base plate 2 is lowered by a lowering amount equal to the prescribed thickness.

Next, the control device 20 according to some embodiments controls the powder laying unit 10 so as to supply the raw material powder 30 to the upper surface side of the base plate 2.

By performing the powder bed forming step S10, a layer of the raw material powder 30 laminated with the prescribed thickness is formed on the upper portion of the powder bed 8.

Beam Profile Conversion Step S20

The beam profile conversion step S20 illustrated in FIG. 2A is a step of converting the beam profile of the light beam 61 output from the oscillation device 91 by the conversion device 93 in the light beam irradiation unit 9. Specifically, the light beam 61 is converted into a light beam 65 having intensity distribution of a high-order mode that is the second order and higher order mode or of a top hat shape.

Figure 3A:
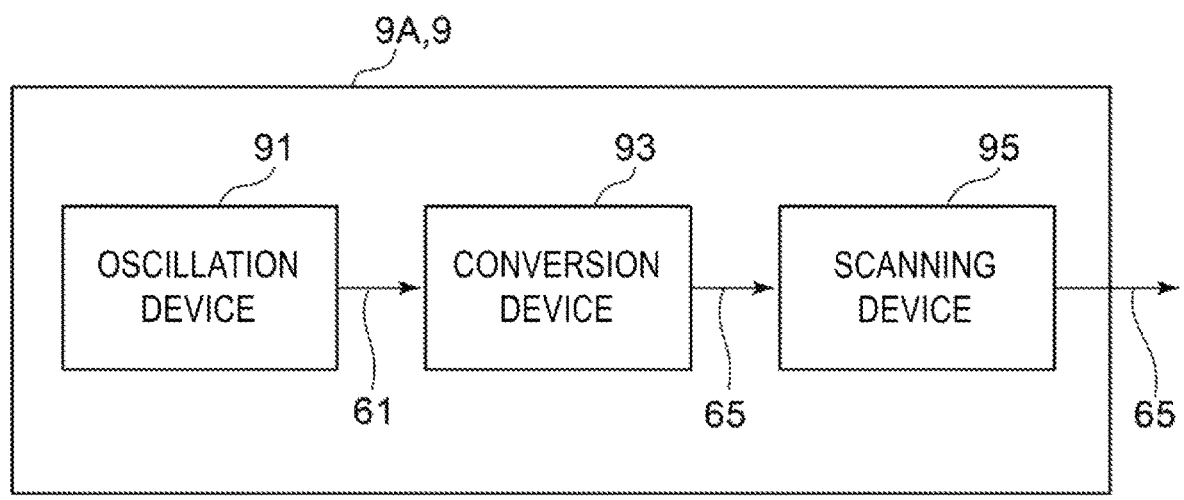
FIG. 3A is a diagram illustrating an overall configuration of a light beam irradiation unit according to at least one embodiment of the disclosure.

FIG. 3A is a diagram illustrating an overall configuration of a light beam irradiation unit 9A according to an embodiment among the light beam irradiation units 9 according to some embodiments. The light beam irradiation unit 9A illustrated in FIG. 3A includes an oscillation device 91 that outputs a light beam 61, a conversion device 93 that converts the light beam 61 output from the oscillation device 91 into a light beam 65 having intensity distribution of a high-order mode that is the second order and higher order mode or of a top hat shape, and a scanning device 95 that scans the light beam 65. The light beam 61 output from the oscillation device 91 is also referred to as a first light beam 61, and the light beam 65 having intensity distribution of a high-order mode that is the second order and higher order mode or of a top hat shape is also referred to as a second light beam 65.

In the light beam irradiation unit 9A illustrated in FIG. 3A, the oscillation device 91 outputs the light beam 61 based on a control signal from the control device 20. For example, when the control signal from the control device 20 includes information on the output of the light beam 61, the oscillation device 91 outputs (emits) the light beam 61 at an output corresponding to the information.

In the light beam irradiation unit 9A illustrated in FIG. 3A, the oscillation device 91 is configured to be capable of outputting a light beam 61 having an intensity distribution of the $TEM_{00}$ mode called a Gaussian beam, for example.

In the light beam irradiation unit 9A illustrated in FIG. 3A, the conversion device 93 is configured to convert the light beam 61 having the intensity distribution of the $TEM_{00}$ mode output from the oscillation device 91 into the light beam 65 having intensity distribution of a high-order mode that is the second order and higher order mode or of a top hat shape.

In the light beam irradiation unit 9A illustrated in FIG. 3A, the conversion device 93 may be referred to, for example, a beam shaper or a beam homogenizer.

The reason why the light beam 61 having the intensity distribution of the $TEM_{00}$ mode output from the oscillation device 91 is converted by the conversion device 93 into the light beam 65 having intensity distribution of a high-order mode that is the second order and higher order mode or of a top hat shape will be described later.

Figure 4A:
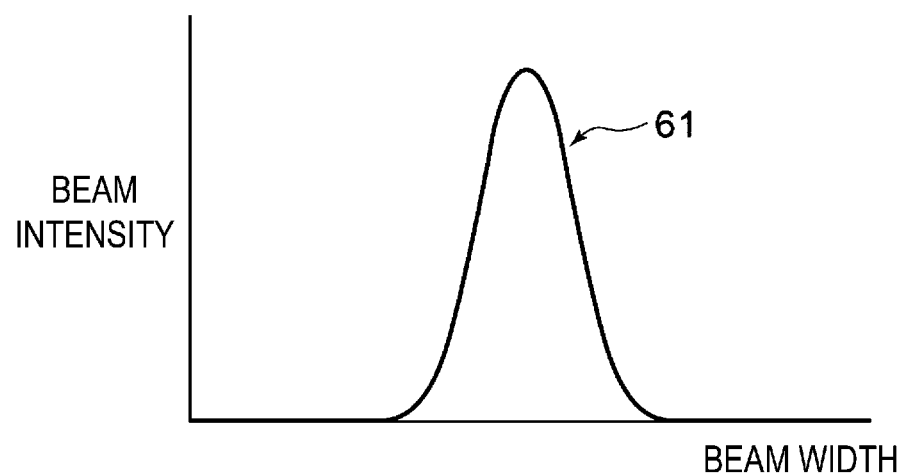
FIG. 4A a diagram illustrating an example of intensity distribution in a cross-section of a light beam output from an oscillation device.

FIG. 4A is a diagram illustrating an example of an intensity distribution in a cross-section of the light beam 61 output from the oscillation device 91, that is, in a cross-section orthogonal to the irradiation direction of the light beam 61.

Figure 4B:
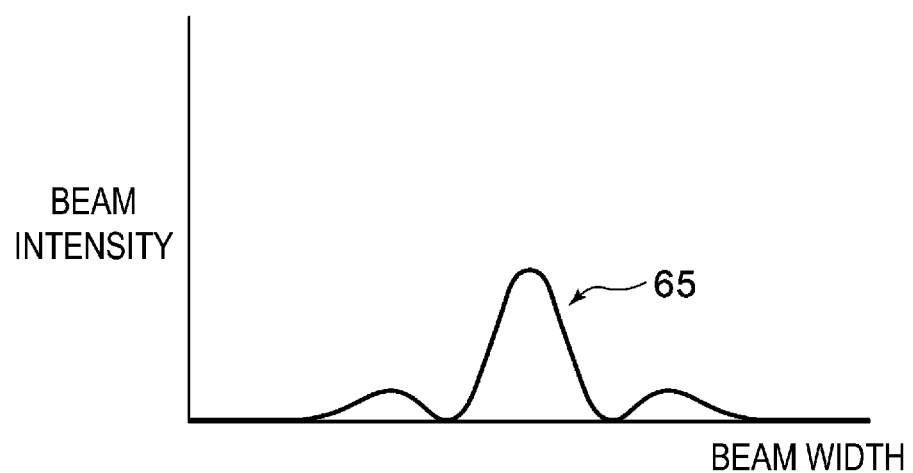
FIG. 4B a diagram illustrating an example of intensity distribution in a cross-section of a light beam output from a conversion device.

FIG. 4B is a diagram illustrating an example of an intensity distribution in a cross-section of the light beam 65 output from the conversion device 93, and illustrates an example of an intensity distribution of a $TEM_{10}$ mode as an example of a high-order mode.

Figure 4C:
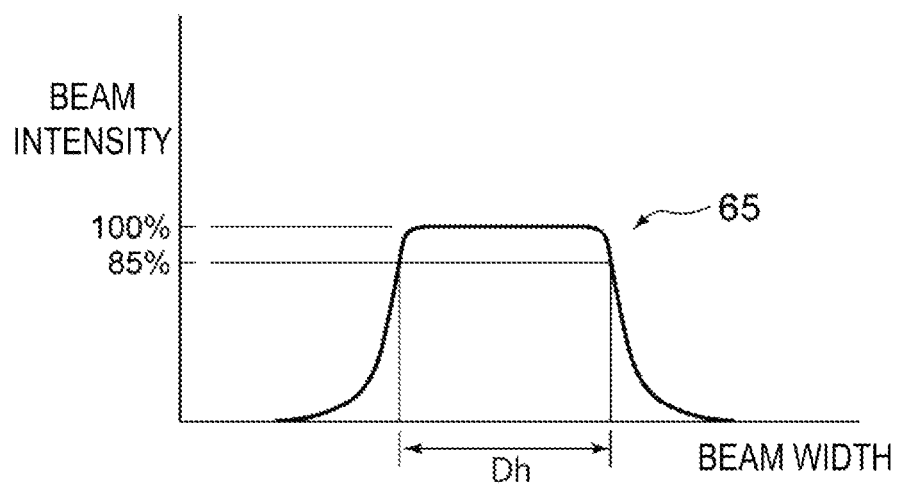
FIG. 4C a diagram illustrating an example of intensity distribution in a cross-section of a light beam output from a conversion device.

FIG. 4C is a diagram illustrating an example of an intensity distribution in a cross-section of the light beam 65 output from the conversion device 93, and illustrates an example of an intensity distribution of a top hat shape.

Figure 3B:
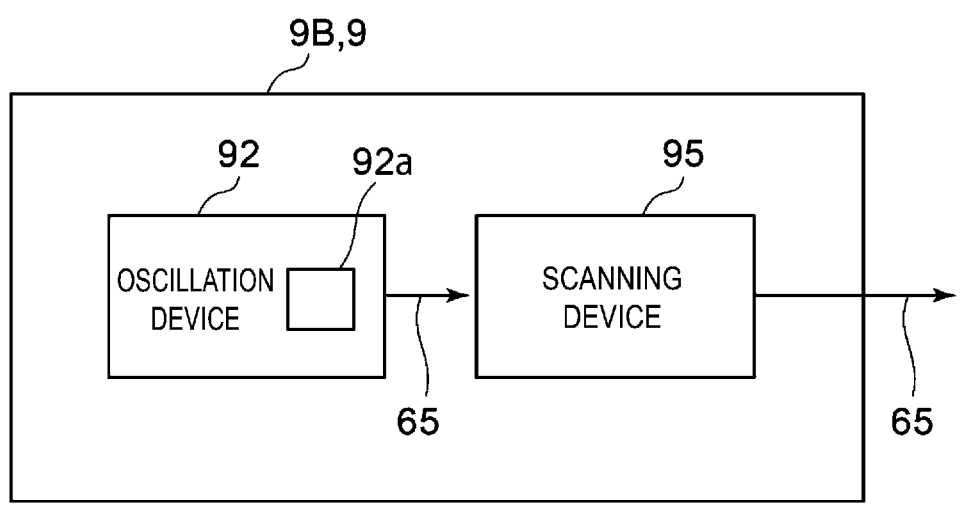
FIG. 3B is a diagram illustrating an overall configuration of a light beam irradiation unit according to another embodiment.

FIG. 3B is a diagram illustrating an overall configuration of a light beam irradiation unit 9B according to another embodiment among the light beam irradiation units 9 according to some embodiments. The light beam irradiation unit 9B illustrated in FIG. 3B includes an oscillation device 92 for outputting the light beam 65 and a scanning device 95 for scanning the light beam 65.

In the light beam irradiation unit 9B illustrated in FIG. 3B, the oscillation device 92 outputs the light beam 65 based on the control signal from the control device 20. For example, when the control signal from the control device 20 includes information on the output of the light beam 65, the oscillation device 92 outputs (emits) the light beam 65 at an output corresponding to the information.

In the light beam irradiation unit 9B illustrated in FIG. 3B, the oscillation device 92 is, for example, configured to be capable of outputting the light beam 65 having intensity distribution of a high-order mode that is the second order and higher order mode or of a top hat shape. That is, in the light beam irradiation unit 9B illustrated in FIG. 3B, the oscillation device 92 includes a beam shaping optical system 92a for outputting the light beam 65 having intensity distribution of a high-order mode that is the second order and higher order mode or of a top hat shape.

Therefore, in the three-dimensional additive manufacturing apparatus 1 illustrated in FIG. 1, when the light beam irradiation unit 9 is the light beam irradiation unit 9B illustrated in FIG. 3B, the beam profile conversion step S20 illustrated in FIG. 2A may not be performed.

That is, the beam profile conversion step S20 illustrated in FIG. 2A is a step of converting the light beam 61 output from the oscillation device 91 in the light beam irradiation unit 9A into the light beam 65 having intensity distribution of a high-order mode that is the second order and higher order mode or of a top hat shape by the conversion device 93 when the light beam irradiation unit 9 is the light beam irradiation unit 9A illustrated in FIG. 3A in the three-dimensional additive manufacturing apparatus 1 illustrated in FIG. 1.

In the light beam irradiation unit 9A illustrated in FIG. 3A, the scanning device 95 is configured to be capable of irradiating the light beam 65 output from the conversion device 93 while scanning the light beam 65 toward the powder bed 8 in an irradiation step S50 described later.

In the light beam irradiation unit 9B illustrated in FIG. 3B, the scanning device 95 is configured to be capable of irradiating the light beam 65 output from the oscillation device 92 while scanning the light beam 65 toward the powder bed 8 in an irradiation step S50 described later.

Irradiation Step S50

The irradiation step S50 is a step of irradiating the raw material powder 30 that forms the powder bed 8 with the light beam 65 having intensity distribution of a high-order mode that is the second order and higher order mode or of a top hat shape.

Specifically, the control device 20 according to some embodiments controls the light beam irradiation unit 9 to irradiate the powder bed 8 with the light beam 65 while scanning the light beam 65.

That is, in the irradiation step S50, the raw material powder 30 on the powder bed 8, which is laminated by the prescribed thickness as described above, is irradiated with the light beam 65 while the light beam 65 is scanned, and is melted and solidified, thereby manufacturing a part of the fabricated object 15.

More specifically, the control device 20 according to some embodiments controls the light beam irradiation unit 9 to perform irradiation while scanning the light beam 65 at a predetermined output and scan rate of the light beam 61.

By performing the irradiation step S50, a part of the fabricated object 15 is newly formed on the upper portion of the powder bed 8 by a thickness corresponding to the prescribed thickness.

Intensity Distribution of Light Beam 65

As described above, for example, in the additive manufacturing method using a powder bed method, raw material powder such as metal powder is rapidly melted in a region irradiated with an energy beam. For this reason, there is a concern that quality of the fabricated object may deteriorate, for example, such that cavities may be generated inside the fabricated object, or generated spatters may be attached to a surface of the fabricated object to reduce surface roughness of the fabricated object.

For example, in the additive manufacturing method using a powder bed method, when the energy beam is a light beam such as a laser beam, it is common to irradiate the raw material powder with a light beam having an intensity distribution of a $TEM_{00}$ mode called a Gaussian beam.

As a result of intensive studies by the inventors, it has been found that in the additive manufacturing method of the powder bed type, internal defect of the fabricated object 15 such as cavities, and generated spatters, can be suppressed by irradiating the raw material powder 30 with the light beam 65 having intensity distribution of a high-order mode that is the second order and higher order mode or of a top hat shape to melt the raw material powder 30.

Therefore, in the additive manufacturing methods according to some embodiments, as described above, in the irradiation step S50, the raw material powder 30 that forms the powder bed 8 is irradiated with the light beam 65 having intensity distribution of a high-order mode that is the second order and higher order mode or of a top hat shape to be melted and solidified.

Therefore, according to the additive manufacturing methods according to some embodiments, it is possible to suppress internal defect of the fabricated object such as cavities, and generated spatters, thereby improving quality of the fabricated object.

In the additive manufacturing method according to some embodiments, the peak intensity of the light beam 65 tends to be lower than the peak intensity of a light beam having an intensity distribution of the $TEM_{00}$ mode generally used in the additive manufacturing method by the powder bed method. However, since the light beam 65 can heat the region around the weld pool more effectively than the light beam having the intensity distribution of the $TEM_{00}$ mode, the weld pool having a size and a depth necessary for manufacturing can be formed even when the peak intensity is lower than the peak intensity of the light beam having the intensity distribution of the $TEM_{00}$ mode.

As described above, since the peak intensity of the light beam 65 tends to be lower than the peak intensity of the light beam having the intensity distribution of the $TEM_{00}$ mode, the filling rate in the fabricated object 15 may decrease.

Therefore, in the additive manufacturing methods according to some embodiments, it is preferable to increase the output of the light beam compared to the output of the light beam in the case of manufacturing by irradiating the light beam having the intensity distribution of the $TEM_{00}$ mode.

In the additive manufacturing methods according to some embodiments, the irradiation step S50 preferably irradiates the raw material powder 30 that forms the powder bed 8 with the light beam 65 of a high-order mode having a peak at the center in a cross-section orthogonal to the irradiation direction of the light beam 65.

That is, in the three-dimensional additive manufacturing apparatus 1 illustrated in FIG. 1, when the light beam irradiation unit 9 is the light beam irradiation unit 9A illustrated in FIG. 3A, in the additive manufacturing methods according to some embodiments, in the beam profile conversion step S20, the light beam 61 output from the oscillation device 91 is preferably converted by the conversion device 93 into the light beam 65 of a high-order mode having a peak at the center in the cross-section orthogonal to the irradiation direction of the light beam 65. Therefore, the conversion device 93 may be configured to be capable of converting the light beam 61 output from the oscillation device 91 into the light beam 65 of a high-order mode having a peak at the center in a cross-section orthogonal to the irradiation direction of the light beam 65.

In the three-dimensional additive manufacturing apparatus 1 illustrated in FIG. 1, when the light beam irradiation unit 9 is the light beam irradiation unit 9B illustrated in FIG. 3B, the oscillation device 92 may be configured to be capable of outputting the light beam 65 of a high-order mode having a peak at the center in a cross-section orthogonal to the irradiation direction of the light beam 65.

As a result of intensive studies by the inventors, it has been found that in the additive manufacturing method of the powder bed type, by irradiating the light beam 65 of a high-order mode having a peak at the center in the cross-section orthogonal to the irradiation direction of the light beam 65 to melt the raw material powder 30, it is possible to further suppress internal defect of the fabricated object 15 such as cavities, and generated spatters.

Therefore, according to the additive manufacturing methods according to some embodiments, the quality of the fabricated object can be further improved.

In the additive manufacturing methods according to some embodiments, in the irradiation step S50, when the maximum value of the beam intensity in the intensity distribution of a top hat shape is 100% as the light beam 65 having the intensity distribution of a top hat shape, the light beam 65 in which the beam diameter Dh corresponding to the beam intensity of 85% has the following size is preferably irradiated on the raw material powder 30 that forms the powder bed 8. The beam diameter Dh is preferably 1.5 times or more and 2.5 times or less a beam diameter that is a beam diameter of the light beam 61 having an intensity distribution of a $TEM_{00}$ mode before converting into the light beam 65 having an intensity distribution of a top hat shape and that also has the intensity decreasing to $1/e^2$ of the intensity of the peak value.

In the irradiation step S50, the beam intensity (peak intensity) of the light beam 65 having the intensity distribution of a top hat shape is preferably 10% or more and 50% or less of the peak intensity of the light beam 61 having the intensity distribution of the $TEM_{00}$ mode before converting into the light beam 65 having the intensity distribution of a top hat shape.

In the additive manufacturing methods according to some embodiments, for example, as shown in FIG. 4C, in the irradiation step S50, when the beam intensity of the light beam 65 in the cross-section orthogonal to the irradiation direction of the light beam 65 is set on the vertical axis, the width of the light beam 65 in the cross-section is set on the horizontal axis, and the maximum value of the beam intensity in the cross-section is set to 100%, the light beam 65 having beam width corresponding to the beam intensity of 85% is 25 μm or more and 50 μm or less may be irradiated on the raw material powder 30 that forms the powder bed 8.

For example, when a shape of the light beam 65 is a circular shape when viewed from the optical axis direction, the beam diameter corresponding to the beam intensity of 85% may be 25 μm or more and 200 μm or less.

That is, in the three-dimensional additive manufacturing apparatus 1 illustrated in FIG. 1, when the light beam irradiation unit 9 is the light beam irradiation unit 9A illustrated in FIG. 3A, in the additive manufacturing methods according to some embodiments, in the beam profile conversion step S20, the light beam 61 output from the oscillation device 91 is preferably converted by the conversion device 93 into the light beam 65 having the above-described intensity distribution. Therefore, the conversion device 93 may be configured to be capable of converting the light beam 61 output from the oscillation device 91 into the light beam 65 having the above-described intensity distribution.

In the three-dimensional additive manufacturing apparatus 1 illustrated in FIG. 1, when the light beam irradiation unit 9 is the light beam irradiation unit 9B illustrated in FIG. 3B, the oscillation device 92 may be configured to be capable of outputting the light beam 65 having the above-described intensity distribution.

As a result of intensive studies by the inventors, it has been found that in the additive manufacturing method of the powder bed type, internal defect of the fabricated object 15 such as cavities, and generated spatters, can be suppressed by irradiating the raw material powder 30 with the light beam 65 having the above-described intensity distribution to melt the raw material powder 30.

Therefore, according to the additive manufacturing methods according to some embodiments, the quality of the fabricated object can be further improved.

In additive manufacturing methods according to some embodiments may include the beam profile conversion step S20 described above, and in the irradiation step S50, the raw material powder 30 that forms the powder bed 8 may be irradiated with the light beam 65 having intensity distribution of a high-order mode that is the second order and higher order mode or of a top hat shape converted in the beam profile conversion step S20.

Accordingly, since the light beam 61 output from the oscillation device 91 can be converted into the light beam 65 having intensity distribution of a high-order mode that is the second order and higher order mode or of a top hat shape, by irradiating the raw material powder 30 that forms the powder bed 8 with the converted light beam 65, it is possible to suppress internal defect of the fabricated object 15 such as cavities, and generated spatters, thereby improving quality of the fabricated object 15.

In additive manufacturing methods according to some embodiments, in the irradiation step S50, the raw material powder 30 that forms the powder bed 8 is preferably irradiated with the light beam 65 that has a peak intensity of 50% or less of the peak intensity of the light beam 61 before entering the conversion device 93 and that has an intensity distribution of a top hat shape.

That is, in the three-dimensional additive manufacturing apparatus 1 illustrated in FIG. 1, when the light beam irradiation unit 9 is the light beam irradiation unit 9A illustrated in FIG. 3A, in the additive manufacturing methods according to some embodiments, in the beam profile conversion step S20, the light beam 61 output from the oscillation device 91 is preferably converted by the conversion device 93 into the light beam 65 having the intensity distribution of a top hat shape as described above. Therefore, the conversion device 93 may be configured to be capable of converting the light beam 61 output from the oscillation device 91 into the light beam 65 having the intensity distribution of a top hat shape as described above.

Accordingly, by converting into the light beam 65 having the intensity distribution of a top hat shape as described above by the conversion device 93, the peak intensity can be reduced as compared with the light beam 61 before the conversion. Therefore, it is possible to suppress internal defect of the fabricated object 15 such as cavities, and generated spatters, and it is possible to improve the quality of the fabricated object 15. Further, by converting into the light beam 65 having the intensity distribution of a top hat shape as described above by the conversion device 93, the size of the weld pool when the raw material powder 30 is melted can be made larger than that in the case where the light beam 61 before the conversion is irradiated, so that the bead width can be made larger. Thus, the manufacturing rate can be improved and the manufacturing time can be shortened.

In order to suppress a decrease in the filling rate of the fabricated object 15 when performing additive manufacturing using the light beam 65 having the intensity distribution of a top hat shape as described above, the output of the light beam 65 is preferably 1.25 times or more the output of the light beam when manufacturing by irradiating the light beam having the intensity distribution of the $TEM_{00}$ mode.

In additive manufacturing methods according to some embodiments, in the irradiation step S50, the raw material powder 30 that forms the powder bed 8 is preferably irradiated with the light beam 65 having a peak intensity of 25% or less of the peak intensity of the light beam 61 before entering the conversion device 93.

More particularly, in additive manufacturing methods according to some embodiments, in the irradiation step S50, the raw material powder 30 that forms the powder bed 8 is preferably irradiated with the light beam 65 that has a peak intensity of 25% or less of the peak intensity of the light beam 61 before entering the conversion device 93 and that has an intensity distribution of a high-order mode that is the second order and higher order mode or of a top hat shape.

That is, in the three-dimensional additive manufacturing apparatus 1 illustrated in FIG. 1, when the light beam irradiation unit 9 is the light beam irradiation unit 9A illustrated in FIG. 3A, in the additive manufacturing methods according to some embodiments, in the beam profile conversion step S20, it is preferable that the light beam 61 output from the oscillation device 91 is preferably converted into the light beam 65 having the peak intensity described above by the conversion device 93. Therefore, the conversion device 93 is preferably configured to be capable of converting the light beam 61 output from the oscillation device 91 into the light beam 65 having the above-described peak intensity.

As a result of intensive studies by the inventors, it has been found that, in the additive manufacturing method of the powder bed type, by irradiating the raw material powder 30 that forms the powder bed 8 with the light beam 65 having a peak intensity of 25% or less of the peak intensity of the light beam 61 before entering the conversion device 93, internal defect of the fabricated object 15 such as cavities, and generated spatters can be effectively suppressed, and the quality of the fabricated object 15 can be further improved.

Therefore, by performing additive manufacturing using the light beam 65 having the above-described peak intensity, it is possible to further improve the quality of the fabricated object 15.

In order to suppress a decrease in the filling rate of the fabricated object 15 when performing additive manufacturing using the light beam 65 having the above-described peak intensity, the output of the light beam 65 is preferably 1.25 times or more the output of the light beam when manufacturing by irradiating the light beam having the intensity distribution of the $TEM_{00}$ mode.

Beam Intensity Distribution Changing Step S30

As described above, the additive manufacturing method illustrated in FIG. 2B may further include a beam intensity distribution changing step S30.

The beam intensity distribution changing step S30 is a step of changing the intensity distribution of the light beam 65 that irradiates the raw material powder 30 that forms the powder bed 8. That is, in the additive manufacturing method illustrated in FIG. 2B, the intensity distribution of the light beam 65 irradiated on the raw material powder 30 that forms the powder bed 8 may be changed before and after performing the beam intensity distribution changing step S30 by performing the beam intensity distribution changing step S30 in the middle of forming the fabricated object 15 by repeatedly performing the powder bed forming step S10 and the irradiation step S50.

Specifically, for example, two or more conversion devices 93 configured such that the beam profiles of the emitted light (second light beam 65) are different from each other may be configured to be replaceable and attachable in the light beam irradiation unit 9A illustrated in FIG. 3A. In addition, the conversion device 93 itself in the light beam irradiation unit 9A illustrated in FIG. 3A may be configured such that the beam profile of the emitted light (second light beam 65) can be changed.

In general, in the additive manufacturing method, there is a trade-off relationship between manufacturing rate and quality such as surface roughness and internal defects.

However, for example, the degree of demand for quality such as surface roughness or internal defect in the fabricated object 15 may differ for each region to be manufactured. For example, there is a case where the fabricated object 15 includes a flow path having a relatively small diameter therein and it is desirable to avoid adhesion of foreign matter such as spatters to the flow path as much as possible, or there is a case where relatively high dimensional accuracy is required for the flow path. On the other hand, there is a case where the fabricated object 15 includes a region where adhesion of foreign matter such as spatters or relatively low dimensional accuracy is allowed, such as a simple thinned-down portion.

In such a case, in a region where the degree of demand for quality is relatively high, it is desirable to manufacture with the light beam 65 having an intensity distribution in which the beam diameter is relatively small, thereby favorably maintaining surface roughness and dimensional accuracy. In addition, in a region where the degree of demand for quality is relatively low, it is desirable to shorten the manufacturing time by manufacturing with the light beam 65 having an intensity distribution in which the beam diameter is relatively large.

Therefore, when the additive manufacturing method illustrated in FIG. 2B includes the beam intensity distribution changing step S30, it is possible to provide both quality of the fabricated object 15 and shorter manufacturing time by appropriately changing the intensity distribution of the light beam 65.

In general, in a selective laser melting (SLM) method such as a powder bed method, a beam diameter of an energy beam is about several tens to several hundreds of micrometers, and in a directed energy deposition (DED) method, a beam diameter of an energy beam is about several millimeters. Therefore, in a SLM method such as the powder bed method, it is possible to manufacture a relatively precise fabricated object compared to when using a DED method.

EXAMPLES

Hereinafter, examples of manufacturing by the additive manufacturing methods according to some embodiments described above will be described.

FIG. 5A is a table showing a relationship between the output of the light beam and the scanning rate of the light beam and the filling rate of the fabricated object, and shows the case of additive manufacturing by a Gaussian beam as a comparative example, that is, a light beam having an intensity distribution of a $TEM_{00}$ mode.

FIG. 5B is a table showing a relationship between the output of the light beam and the scanning rate of the light beam and the filling rate of the fabricated object, and shows the case of additive manufacturing by a light beam having an intensity distribution of a $TEM_{10}$ mode as an example of the high-order mode.

FIG. 5C is a table showing a relationship between the output of the light beam and the scanning rate of the light beam and the filling rate of the fabricated object, and shows the case of additive manufacturing by a light beam having an intensity distribution of a top hat shape.

In FIGS. 5A to 5C, "GOOD" is entered in the column of the condition in which the filling rate is determined to be good, and "POOR" is entered in the column of the condition in which the filling rate is determined to be poor. Here, the filling rate is a percentage of a value obtained by dividing an area in which a material is present in a cut surface obtained by cutting the fabricated object (test piece) after manufacturing, that is, an area obtained by subtracting an area of pores appearing in the cut surface from an area of the cut surface, by the area of the cut surface.

In FIGS. 5A to 5C, the raw material powder used for manufacturing the test piece is powder of a nickel-based alloy, and the particle size thereof is 15 to 45 μm.

As is clear from FIGS. 5A to 5C, as compared with the case of additive manufacturing with a light beam having an intensity distribution of the $TEM_{00}$ mode as a comparative example, the range of conditions under which the filling rate was determined to be favorable is expanded in the case of additive manufacturing with a light beam having an intensity distribution of the $TEM_{10}$ mode and in the case of additive manufacturing with a light beam having an intensity distribution of a top hat shape. In addition, as compared with the case of additive manufacturing with a light beam having an intensity distribution of the $TEM_{00}$ mode as a comparative example, the output of the light beam determined to have a favorable filling rate tends to be high as a whole in the case of additive manufacturing with a light beam having an intensity distribution of the $TEM_{10}$ mode and in the case of additive manufacturing with a light beam having an intensity distribution of a top hat shape. This is thought to be because the peak intensity of the light beam is decreased in the case of additive manufacturing with a light beam having an intensity distribution of the $TEM_{10}$ mode and in the case of additive manufacturing with a light beam having an intensity distribution of a top hat shape, as compared with the case of additive manufacturing with a light beam having an intensity distribution of the $TEM_{00}$ mode as a comparative example.

FIGS. 6A to 6D are bar graphs showing the difference in the amount of spatters due to the difference in the intensity distribution of the light beam. In FIGS. 6A to 6D, the amount of spatters generated when additive manufacturing is performed by a light beam having an intensity distribution of the $TEM_{00}$ mode as a comparative example is set to 1. It should be noted that the spatters measured in FIGS. 6A to 6D are spatters having a size larger than 100 μm, which have a relatively large influence on the dimensional accuracy or the like of the fabricated object.

Figure 6A:
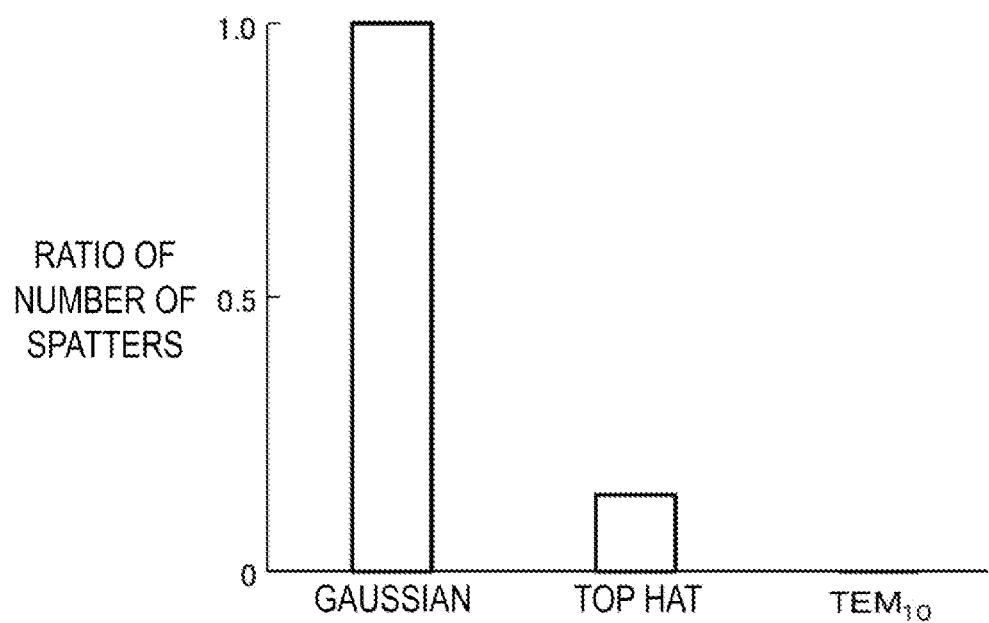
FIG. 6A is a bar graph illustrating the difference in the amount of spatters due to the difference in the intensity distribution of the light beam.

The bar graph in the FIG. 6A shows the results when the output of the light beam is 80 (W) and the scanning rate of the light beam is 100 (mm/sec).

Figure 6B:
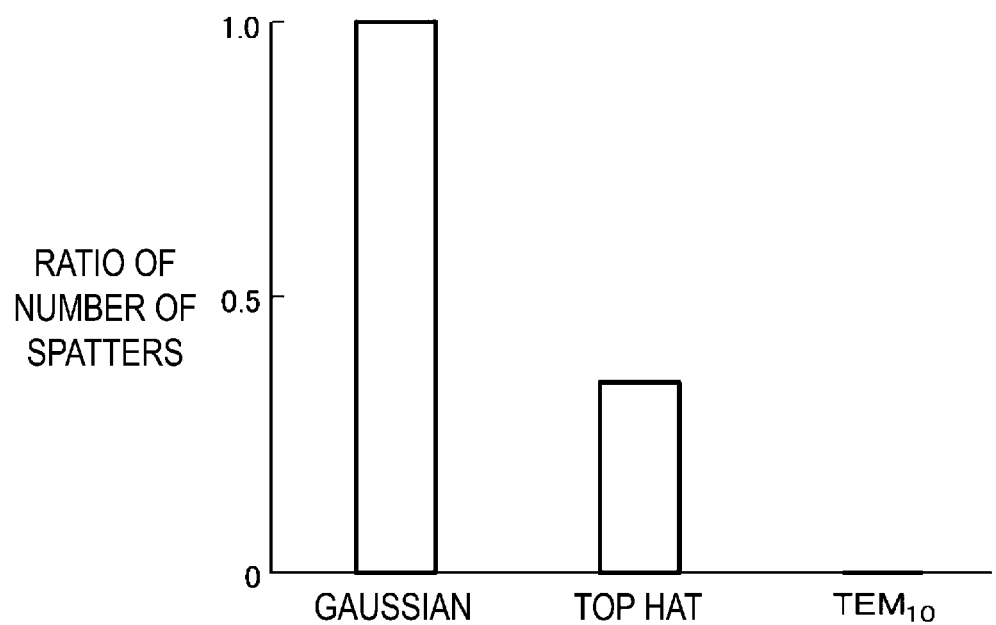
FIG. 6B is a bar graph illustrating the difference in the amount of spatters due to the difference in the intensity distribution of the light beam.

The bar graph in the FIG. 6B shows the results when the output of the light beam is 110 (W) and the scanning rate of the light beam is 200 (mm/sec).

Figure 6C:
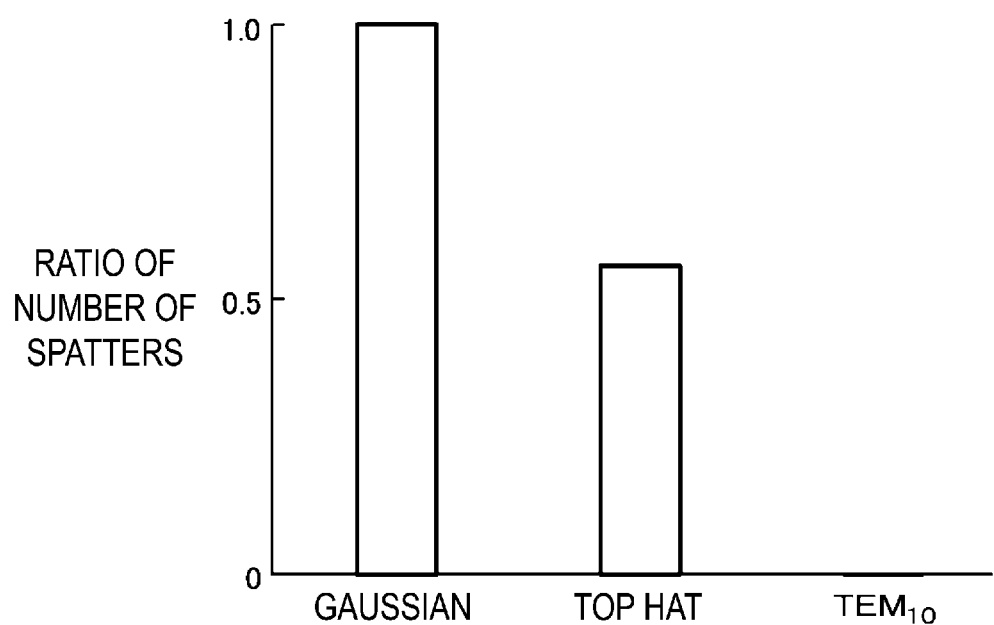
FIG. 6C is a bar graph illustrating the difference in the amount of spatters due to the difference in the intensity distribution of the light beam.

The bar graph in the FIG. 6C shows the results when the output of the light beam is 110 (W) and the scanning rate of the light beam is 300 (mm/sec).

Figure 6D:
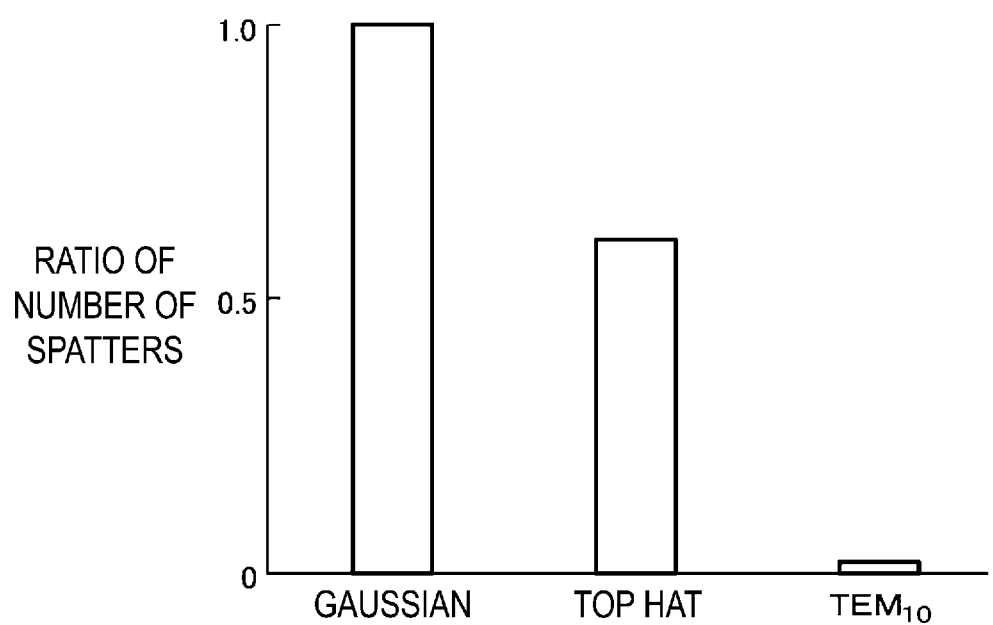
FIG. 6D is a bar graph illustrating the difference in the amount of spatters due to the difference in the intensity distribution of the light beam.

The bar graph in the FIG. 6D shows the results when the output of the light beam is 140 (W) and the scanning rate of the light beam is 500 (mm/sec).

As is clear from FIGS. 6A to 6D, as compared with the case of additive manufacturing with a light beam having an intensity distribution of the $TEM_{00}$ mode as a comparative example, the spatters having the size larger than 100 μm can be effectively suppressed in the case of additive manufacturing with a light beam having an intensity distribution of the $TEM_{10}$ mode and in the case of additive manufacturing with a light beam having an intensity distribution of a top hat shape.

The disclosure is not limited to the above-described embodiments, and includes embodiments obtained by modifying the above-described embodiments and embodiments obtained by appropriately combining these embodiments.

The content described in each of the above embodiments are understood as follows, for example.

(1) An additive manufacturing method according to at least one embodiment of the disclosure includes the steps of, forming a powder bed 8 by supplying a raw material powder 30 (powder bed forming step S10), and irradiating the raw material powder 30 that forms the powder bed 8 with a light beam 65 having intensity distribution of a high-order mode that is the second order and higher order mode or of a top hat shape (irradiation step S50).

According to the above method (1), it is possible to suppress an internal defect of the fabricated object 15 such as cavities, and generated spatters, and it is possible to improve quality of the fabricated object.

(2) In some embodiments, in the above method (1), in the step of irradiating with the light beam (irradiation step S50), the raw material powder 30 that forms the powder bed 8 is irradiated with a light beam 65 of a high-order mode having a peak at a center in a cross-section orthogonal to an irradiation direction of the light beam 65.

According to the method (2), it is possible to further suppress an internal defect of the fabricated object 15 such as cavities, and generated spatters, and it is possible to further improve quality of the fabricated object 15.

(3) In some embodiments, in the above method (1), in the step (irradiation step S50) of irradiating with the light beam, when the beam intensity of the light beam 65 in the cross-section orthogonal to the irradiation direction of the light beam 65 is set on a vertical axis, the width of the light beam 65 in the cross-section is set on a horizontal axis, and the maximum value of the beam intensity in the cross-section is set to 100%, the raw material powder 30 that forms the powder bed 8 may be irradiated with the light beam 65 having the width of the light beam 65 corresponding to the beam intensity of 85% of 25 μm or more and 200 μm or less.

According to the above method (3), it is possible to further suppress an internal defect of the fabricated object 15 such as cavities, and generated spatters, and it is possible to further improve quality of the fabricated object.

(4) In some embodiments, the above method (1) or (2) further includes a step of converting, by a conversion device 93, a light beam 61 output from an oscillation device 91 into a light beam 65 having intensity distribution of a high-order mode or of a top hat shape (beam profile conversion step S20). In the step S50 of irradiating with the light beam, the raw material powder 30 that forms the powder bed 8 is irradiated with the light beam 65 having intensity distribution of a high-order mode or of a top hat shape converted in the beam profile conversion step S20.

According to the above method (4), since the light beam 61 output from the oscillation device 91 can be converted into the light beam 65 having intensity distribution of a high-order mode or of a top hat shape, by irradiating the raw material powder 30 that forms the powder bed 8 with the converted light beam 65, it is possible to suppress internal defect of the fabricated object 15 such as cavities, and generated spatters, thereby improving quality of the fabricated object.

(5) In some embodiments, in the above method (4), in the step of converting (beam profile converting step S20), when a maximum value of the beam intensity in the intensity distribution of the top hat shape is set to 100%, the light beam is converted by the conversion device 93 such that a beam diameter corresponding to a beam intensity of 85% is 1.5 times or more and 2.5 times or less a beam diameter that is a beam diameter of the light beam 61 before entering the conversion device 93 and that has the intensity decreasing to $1/e^2$ of the peak intensity of the light beam 61.

According to the above method (5), by irradiating the raw material powder 30 that forms the powder bed 8 with the light beam 65 having the beam profile described above, it is possible to suppress internal defect of the fabricated object 15 such as cavities, and generated spatters, and it is possible to improve the quality of the fabricated object.

(6) In some embodiments, in the above method (5), in the step of irradiating with a light beam (irradiation step S50), the raw material powder 30 that forms the powder bed 8 is irradiated with the light beam 65 that has a peak intensity of 50% or less of the peak intensity of the light beam 61 before entering the conversion device 93 and that has the intensity distribution of the top hat shape.

According to the above method (6), by converting into the light beam 65 having the intensity distribution of a top hat shape as described above by the conversion device 93, the peak intensity can be reduced as compared with the light beam 61 before the conversion. Therefore, it is possible to suppress internal defect of the fabricated object 15 such as cavities, and generated spatters, and it is possible to improve the quality of the fabricated object 15. Further, by converting into the light beam 65 having the intensity distribution described above by the conversion device 93, the size of the weld pool when the raw material powder 30 is melted can be made larger than that in the case where the light beam 61 before the conversion is irradiated, so that the bead width can be made larger. Thus, the manufacturing rate can be improved and the manufacturing time can be shortened.

(7) In some embodiments, in the above step (5), in the step of irradiating with the light beam (irradiation step S50), the raw material powder 30 that forms the powder bed 8 is irradiated with the light beam 65 having a peak intensity of 25% or less of the peak intensity of the light beam 61 before entering the conversion device 93.

According to the above method (7), by converting into the light beam 65 having the peak intensity described above by the conversion device 93, the peak intensity can be reduced as compared with the light beam 61 before the conversion. Therefore, it is possible to suppress internal defect of the fabricated object 15 such as cavities, and generated spatters, and it is possible to improve the quality of the fabricated object 15.

(8) In some embodiments, any one of the above methods (1) to (7) further includes a step of changing the intensity distribution of the light beam 65 that irradiates the raw material powder 30 that forms the powder bed 8 (beam intensity distribution changing step S30).

According to the above method (8), in a case where the degree of demand for quality such as surface roughness or internal defect in the fabricated object 15 may differ for each region to be manufactured, it is possible to achieve both the quality of the fabricated object 15 and the shortening of the manufacturing time by appropriately changing the intensity distribution of the light beam 65.

(9) An additive manufacturing apparatus (three-dimensional additive manufacturing apparatus 1) according to at least one embodiment of the disclosure includes, a powder bed forming unit 5 including a base plate 2 on which a powder bed 8 is formed by supplied raw material powder 30, and an irradiation unit (light beam irradiation unit 9) capable of irradiating the raw material powder 30 that forms the powder bed 8 with a light beam 65 having intensity distribution of a high-order mode that is the second order and higher order mode or of a top hat shape.

As described above, as a result of intensive studies by the inventors, it has been found that in the additive manufacturing method of the powder bed type, internal defect of the fabricated object 15 such as cavities, and generated spatters, can be suppressed by irradiating the raw material powder 30 with the light beam 65 having intensity distribution of a high-order mode that is the second order and higher order mode or of a top hat shape to melt the raw material powder 30.

Therefore, according to the above configuration (9), it is possible to suppress an internal defect of the fabricated object 15 such as cavities, and generated spatters, and it is possible to manufacture the fabricated object 15 having favorable quality.

(10) In some embodiments, in the above configuration (9), the irradiation unit (light beam irradiation unit 9B) may include, an oscillation device 92 configured to output the light beam 65 having intensity distribution of the high-order mode that is the second order and higher order mode or of the top hat shape, and a scanning device 95 configured to scan the light beam 65 output from the oscillation device 92. The oscillation device 92 preferably includes, a beam shaping optical system 92a configured to output the light beam 65 having intensity distribution of the high-order mode that is the second order and higher order mode or of the top hat shape.

According to the above configuration (10), it is possible to melt the raw material powder 30 by irradiating with the light beam 65 having intensity distribution of the high-order mode that is the second order and higher order mode or of the top hat shape. Therefore, it is possible to suppress internal defect of the fabricated object 15 such as cavities, and generated spatters, and it is possible to manufacture the fabricated object 15 having good quality.

Further, according to the above configuration (10), since it is not necessary to additionally provide a conversion device that converts the beam profile in the light beam irradiation unit 9B, it is possible to suppress complication of the apparatus configuration.

(11) In some embodiments, in the above configuration (9), the irradiation unit (light beam irradiation unit 9A) preferably includes, an oscillation device 91 configured to output a first light beam 61, a conversion device 93 configured to convert the first light beam 61 into a second light beam 65 having intensity distribution of the high-order mode that is the second order and higher order mode or of the top hat shape, and a scanning device 95 configured to scan the second light beam output from the conversion device 93.

According to the above configuration (11), it is possible to melt the raw material powder 30 by irradiating with the light beam 65 having intensity distribution of the high-order mode that is the second order and higher order mode or of the top hat shape. Therefore, it is possible to suppress internal defect of the fabricated object 15 such as cavities, and generated spatters, and it is possible to manufacture the fabricated object 15 having good quality. Further, according to the above configuration (11), the conversion device 93 may be additionally provided in the irradiation unit. In this case, in the existing three-dimensional additive manufacturing apparatus 1, it is possible to melt the raw material powder 30 by irradiating the raw material powder 30 with the light beam 65 having intensity distribution of the high-order mode that is the second order and higher order mode or of the top hat shape.

(12) In some embodiments, in the above configuration (11), the irradiation unit (light beam irradiation unit 9A) may be configured such that two or more of are replaceable and attachable. The conversion devices 93 are configured such that beam profiles of the second light beams 65 differ from each other.

According to the above configuration (12), for example, the beam profile of the second light beam 65 can be changed according to the degree of demand for quality such as surface roughness or internal defects in the fabricated object 15, and thus it is possible to improve the quality of the fabricated object 15 and to shorten the manufacturing time.

(13) In some embodiments, in the above configuration (11), the conversion device 93 may be configured to be capable of changing a beam profile of the second light beam 65.

According to the above configuration (13), for example, the beam profile of the second light beam 65 can be changed according to the degree of demand for quality such as surface roughness or internal defects in the fabricated object 15, and thus it is possible to improve the quality of the fabricated object 15 and to shorten the manufacturing time.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An additive manufacturing method, comprising:
forming a powder bed by supplying a raw material powder; and
irradiating the raw material powder that forms the powder bed with a light beam having an intensity distribution of a second or higher order mode or of a top hat shape,
wherein, when a beam intensity of the light beam in a cross section orthogonal to an irradiation direction of the light beam is set on a vertical axis, a width of the light beam in the cross section is set on a horizontal axis, a maximum value of the beam intensity in the cross section is 100%, and the raw material powder that forms the powder bed is irradiated with the light beam such that the width of the light beam corresponding to the beam intensity of 85% is 25 μm or more and 200 μm or less.

2. The additive manufacturing method according to claim 1,
wherein the light beam has a peak at a center in the cross section.

3. The additive manufacturing method according to claim 1, wherein:
the light beam is a second light beam; and
the additive manufacturing method further comprises converting, by a conversion device, a first light beam output from an oscillation device into the second light beam.

4. The additive manufacturing method according to claim 3, wherein
in the converting, when a maximum value of the beam intensity in the intensity distribution of the top hat shape is set to 100%, the first light beam is converted by the conversion device such that a beam diameter corresponding to the beam intensity of 85% is 1.5 times or more and 2.5 times or less a beam diameter of the first light beam before entering the conversion device that has the beam intensity decreasing to $1/e^2$ of a peak intensity of the first light beam.

5. The additive manufacturing method according to claim 4, wherein
the second light beam has a peak intensity of 50% or less of the peak intensity of the first light beam before entering the conversion device.

6. The additive manufacturing method according to claim 4, wherein
the second light beam has a peak intensity of 25% or less of the peak intensity of the first light beam before entering the conversion device.

7. The additive manufacturing method according to claim 1, further comprising:
changing the intensity distribution of the light beam.

8. An additive manufacturing apparatus, comprising:
a forming unit including a base plate on which a powder bed is to be formed by a supply of raw material powder; and
an irradiation unit capable of irradiating the raw material powder that forms the powder bed with a light beam having an intensity distribution of a second or higher order mode or of a top hat shape,
wherein, when a beam intensity of the light beam in a cross section orthogonal to an irradiation direction of the light beam is set on a vertical axis, a width of the light beam in the cross section is set on a horizontal axis, a maximum value of the beam intensity in the cross section is 100%, and the raw material powder that forms the powder bed is irradiated with the light beam such that the width of the light beam corresponding to the beam intensity of 85% is 25 μm or more and 200 μm or less.

9. The additive manufacturing apparatus according to claim 8,
wherein the irradiation unit includes:
an oscillation device configured to output the light beam; and
a scanning device configured to scan the light beam, and
wherein the oscillation device includes:
a beam shaping optical system configured to output the light beam.

10. The additive manufacturing apparatus according to claim 8, wherein:
the light beam is a second light beam; and
the irradiation unit includes:
an oscillation device configured to output a first light beam;
a conversion device configured to convert the first light beam into the second light beam; and
a scanning device configured to scan the second light beam output from the conversion device.

11. The additive manufacturing apparatus according to claim 10, wherein
the irradiation unit is configured such that two or more of the conversion devices are replaceable and attachable, and the two or more conversion devices are configured to have beam profiles of the second light beams which differ from each other.

12. The additive manufacturing apparatus according to claim 10, wherein
the conversion device is capable of changing a beam profile of the second light beam.

* * * * *